Patented May 31, 1932

1,861,127

UNITED STATES PATENT OFFICE

FORREST B. McLANE, OF RIVERA, CALIFORNIA

INSECTICIDE AND LARVACIDE

No Drawing.  Application filed March 15, 1930. Serial No. 436,249.

This invention relates to an improved insecticide, and has for one of its principal objects the control of the volatilization of an insect poison such as nicotine sulphate when in combination with diatomaceous earth.

One of the important objects of this invention is to provide a combination of a sugar or carbohydrate with nicotine sulphate in a carrier of celite or diatomaceous earth whereby the nicotine or poison fumes are released slowly by volatilization, thereby affording a much more definite control of the insects.

Celite or diatomaceous earth has for some time been considered an ideal carrier for a nicotine dust. However, this material has never been used as a carrier due to the fact that by the introduction of nicotine into this material, it (the nicotine) is locked up in such a manner that not enough nicotine fumes are released to be of value as an insecticide.

It was discovered that a combination of sugar and nicotine mixed thoroughly into diatomaceous earth caused the release of sufficient nicotine fumes to effect a very satisfactory control when applied on infested plants. Several experiments were conducted in order to determine its advantages, if any, over the regular carrier of nicotine dust, namely hydrated lime. It was discovered that the diatomaceous earth gave a much better coverage due to its lightness and its being so finely ground. It penetrated into the small folds of the plants and gave a better control. It was also discovered that where lime had been injurious to young tender growth, this material could be used without the slightest injury. This is of particular value to such plants as strawberries, ferns, rhubarb and melons which are all susceptible to lime injury.

Check plots were put out in order to determine its adhesive qualities. It was discovered that a heavy deposit of diatomaceous earth dust remained where ordinary lime dust did not. This adhesive quality increased the control by building up the deposit. In damp weather, it was found that this material gave an effect similar to a liquid spray, there being no wash off as is the case with lime.

Checks were made to determine the coverage phase. It was found that this material covered twice as much space as did lime.

Another very important factor is the fact that this material will absorb a great deal more liquid than lime will absorb. For example, a ten percent (10%) dust is considered to be about the limit using a lime carrier. A diatomaceous earth dust containing 33⅓% liquid has been successfully used. This permits a much stronger dust being made when conditions require it.

Some of the preferred mixtures for producing an insecticide in accordance with the principles of this invention are as follows:

| | Pounds |
|---|---|
| Nicotine sulphate, 40% | 7 |
| Carbohydrate | 3 |
| Water | 4 |
| Diatomaceous earth | 86 |
| Nicotine sulphate, 40% | 9 |
| Carbohydrate | 3 |
| Water | 2 |
| Diatomaceous earth | 86 |
| Nicotine sulphate, 40% | 5 |
| Carbohydrate | 3 |
| Water | 6 |
| Diatomaceous earth | 86 |

The three above formulas have been used with greater efficiency than lime dust on the following plants: cabbage, rhubarb, broccoli, cantaloupes, rutabagas and ferns. It is reasonable to assume that it will be just as satisfactory on other crops.

So far as is known, this is the first time that it has been possible to release nicotine sulphate or free nicotine from this material in sufficient quantities to be effective as an insecticide. Cane sugar, beet sugar, Karo syrup and molasses have been used, and all of these materials will release nicotine fumes from the diatomaceous earth slowly but in sufficient quantities to be toxic to such insects as cabbage aphis, citrus aphis, pea aphis, alfalfa aphis, walnut aphis, cucumber beetle, and the flea beetle. It was also found to be of some value in the control of the pepper weevil, a more resistant insect.

It will be evident that herein is provided an insecticidal dust which can be made for approximately one-half the cost of the present nicotine dusts and that a better coverage and control is effected. Further, a lighter and more fluffy dust results, and a considerable saving of nicotine can be had, while at the same time the dust has more adhesive qualities and is without injurious effects to tender growths.

I am aware that many changes may be made in the nature of the ingredients used and the proportions thereof varied throughout a wide range without affecting the underlying principles of this invention, and I, therefore, do not purpose limiting the patent granted hereon otherwise than as necessitated by the prior art.

I claim as my invention:

1. An insecticide comprising nicotine sulphate and sugar in conjunction with diatomaceous earth.

2. An insecticide comprising nicotine sulphate and sugar in a mixture, the same being thoroughly incorporated into a much greater proportion of a dry carrying agent.

3. A combination insecticide and larvacide comprising nicotine sulphate, 5 to 10 lbs.; sugar, 2 to 5 lbs.; water, 2 to 8 lbs.; and diatomaceous earth, 75 to 100 lbs.

In testimony whereof I affix my signature.

FORREST B. McLANE.